(12) United States Patent
Herbeth et al.

(10) Patent No.: US 8,840,517 B2
(45) Date of Patent: Sep. 23, 2014

(54) METHOD FOR OPERATING A TRANSMISSION DEVICE HAVING A PLURALITY OF FRICTION-FIT SHIFT ELEMENTS AND AT LEAST ONE FORM-FIT SHIFT ELEMENT

(75) Inventors: Valentine Herbeth, Friedrichshafen (DE); Jorg Arnold, Immenstaad (DE); Georg Mihatsch, Lindau (DE); Andreas Schmidt, Bavendorf (DE); Thilo Schmidt, Meckenbeuren (DE); Gabor Diosi, Friedrichshafen (DE); Christoph Margraf, Salem (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 172 days.

(21) Appl. No.: 13/521,750

(22) PCT Filed: Dec. 21, 2010

(86) PCT No.: PCT/EP2010/070385
§ 371 (c)(1),
(2), (4) Date: Jul. 12, 2012

(87) PCT Pub. No.: WO2011/085925
PCT Pub. Date: Jul. 21, 2011

(65) Prior Publication Data
US 2012/0283064 A1 Nov. 8, 2012

(30) Foreign Application Priority Data
Jan. 13, 2010 (DE) .................. 10 2010 000 859

(51) Int. Cl.
*F16H 3/62* (2006.01)
*B60W 10/02* (2006.01)
*F16H 3/44* (2006.01)
*F16H 61/04* (2006.01)
*F16H 61/686* (2006.01)
*F16H 3/66* (2006.01)

(52) U.S. Cl.
CPC .......... *F16H 61/04* (2013.01); *F16H 220/2046* (2013.01); *F16H 2003/442* (2013.01); *F16H 2306/44* (2013.01); *F16H 2306/46* (2013.01); *F16H 2061/0481* (2013.01); *F16H 2200/2012* (2013.01); *F16H 2061/0429* (2013.01); *F16H 2200/2064* (2013.01); *F16H 61/686* (2013.01);
*F16H 2061/0407* (2013.01); *F16H 2200/0065* (2013.01); *F16H 3/666* (2013.01)
USPC .............................. 475/275; 477/70; 477/180

(58) Field of Classification Search
USPC ............... 475/275, 282, 288; 477/70, 76, 180
See application file for complete search history.

(56) References Cited

U.S. PATENT DOCUMENTS

| | | | |
|---|---|---|---|
| 5,417,627 A | 5/1995 | Iizuka | |
| 5,997,435 A | 12/1999 | Back | |
| 6,962,549 B2 | 11/2005 | Dreibholz et al. | |
| 7,951,043 B2 | 5/2011 | Reisch et al. | |
| 8,113,983 B2 | 2/2012 | Gumpoltsberger | |
| 8,187,151 B2 | 5/2012 | Gloge | |
| 2007/0004555 A1 | 1/2007 | Berger | |
| 2007/0011507 A1 | 1/2007 | Rothman et al. | |
| 2011/0009229 A1 | 1/2011 | Bauknecht et al. | |
| 2012/0135838 A1 | 5/2012 | Cuppers et al. | |
| 2013/0281246 A1* | 10/2013 | Neelakantan et al. | 475/275 |

FOREIGN PATENT DOCUMENTS

| | | |
|---|---|---|
| DE | 39 37 302 A1 | 5/1991 |
| DE | 43 02 247 A1 | 7/1993 |
| DE | 197 17 042 A1 | 10/1998 |
| DE | 102 44 023 A1 | 4/2004 |
| DE | 10 2005 013 137 A1 | 9/2006 |
| DE | 10 2007 011 507 A1 | 9/2008 |
| DE | 10 2007 022 776 A1 | 12/2008 |
| DE | 10 2008 000 429 A1 | 9/2009 |
| DE | 10 2008 040 665 A1 | 6/2010 |
| DE | 10 2009 028 305 A1 | 2/2011 |
| EP | 0 992 706 A2 | 4/2000 |
| GB | 2 335 010 A | 9/1999 |
| WO | 2011/015466 A1 | 2/2011 |

* cited by examiner

*Primary Examiner* — Jacob S Scott
(74) *Attorney, Agent, or Firm* — Davis & Bujold, PLLC; Michael J. Bujold

(57) ABSTRACT

A method of operating a transmission device (3) having a plurality of frictionally engaging shift elements (B, C, D and E) and at least one form-locking shift element (A, F) for implementing different transmission ratios. Upon a requested change in operating state of the transmission device (3), the at least one form-locking shift element (A) is transferred into an at least nearly load-free state, during which the form-locking shift element (A) is transferred from an engaged to a disengaged operating state by increasing the transfer capability of at least one frictionally engaging shift element (E), which is not engaged in the power flow of the transmission device (3) either to represent the present operating state or to represent the requested operating state.

7 Claims, 4 Drawing Sheets

(PRIOR ART) Fig. 2

|     | A   | B | C | D | E | F |
|-----|-----|---|---|---|---|---|
| "1" | X   |   |   | X |   | X |
| "2" | X   |   | X |   |   | X |
| "3" | X   | X |   |   |   | X |
| "4" | (X) |   |   |   | X | X |
| "5" | X   | X |   |   | X |   |
| "6" | X   |   | X |   | X |   |
| "7" | X   |   |   | X | X |   |
| "8" |     |   | X | X | X |   |
| "9" |     | X |   | X | X |   |
| "R" |     | X |   | X |   | X |
| "N" |     |   |   |   |   | X |

METHOD FOR OPERATING A TRANSMISSION DEVICE HAVING A PLURALITY OF FRICTION-FIT SHIFT ELEMENTS AND AT LEAST ONE FORM-FIT SHIFT ELEMENT

This application is a National Stage completion of PCT/EP2010/070385 filed Dec. 21, 2010, which claims priority from German patent application serial no. 10 2010 000 859.1 filed Jan. 13, 2010.

FIELD OF THE INVENTION

The invention relates to a method for operating a transmission device having a plurality of frictionally engaging shift elements and at least one form-locking shift element.

BACKGROUND OF THE INVENTION

Vehicle drive trains known from the prior art are typically designed having an internal combustion engine and at least one transmission device, disposed between the internal combustion engine and an output drive, by means of which the transmission ratios that are required depending on the operating state can be provided.

Such transmission devices known per se and implemented as automatic transmissions, are designed having shift elements for implementing different transmission ratios, by means of which a present torque can be transferred in a frictionally-engaging manner. With a request for implementing a defined transmission ratio, at least one or a plurality of the frictionally engaging shift elements are disengaged from the power flow of a transmission device, while at least one or more additional frictionally engaging shift elements are engaged into the power flow of a transmission device to implement the required transmission ratio. During the process of engaging a frictionally engaging shift element, no particular synchronization measures are necessary for guaranteeing desired shifting comfort and shifting without any tractive force interruption, because sought-after shifting comfort and also shifting without any tractive force interruption can be achieved by means of frictionally engaging shift elements at defined contact pressures within a wide range of rotational speed differences.

Since, in a manner known per se, such transmission devices can only be operated with insufficient degrees of efficiency because of drag losses that occur in the area of disengaged frictionally engaging shift elements, certain frictionally engaging shift elements are replaced by form-locking shift elements. With automatic transmissions, which are implemented having both frictionally engaging shift elements as well as at least one form-locking shift element, and having a corresponding gear set design, at least one form-locking shift element must be engaged in the power flow of the transmission device to carry out a defined shift command.

Disadvantageously, depending on the design arrangement of the shift elements, while performing a request for a change of operating state of the transmission device, during which an engaged form-locking shift element is to be transferred into a disengaged operating state, the possibility exists that the form-locking shift element cannot be disengaged within an acceptable shift time with high shift comfort due to high drag torques which occur in the region of disengaged frictionally engaging shift elements, and/or due to a torque present during a downshift that is preferably without an interruption of tractive force.

SUMMARY OF THE INVENTION

Therefore, the problem addressed by the present invention is to provide a method for operating a transmission device by means of which shifts in transmission devices, in which at least one form-locking shift element participates, can be performed preferably without interruption of tractive force and with high shift comfort within a predefined shift time.

In the method according to the invention for operating a transmission device having four planetary gear sets and six shift elements for selectively shifting nine forward gears and one reverse gear, wherein there are two form-locking shift elements among the six shift elements, in each case three shift elements are simultaneously held in an engaged operating state to establish a power flow in the transmission device. Here, a first form-locking shift element, with a requested change of the operating step of the transmission device, is transferred from an engaged operating state into a disengaged operating state. That is, the first form-locking shift element is transferred at least nearly into a load-free state by increasing the transfer capability of at least one frictionally engaging shift element and in this state is transferred into the disengaged operating state thereof. Here, the frictionally engaging shift element is only temporarily engaged in the power flow of the transmission device and is not to be engaged in the power flow of the transmission device either for representing a present operating (current) state or for representing a requested operating state.

Therefore, the at least one form-locking shift element to be disengaged is transferred into an at least nearly load-free operating state effectively, cost-effectively and with low construction space requirements of the transmission device during a requested change of the operating state of the transmission device, or during a requested shift in the transmission device, by an appropriate operation of devices already present in the transmission device, without additional design measures, that is, presently by means of at least one frictionally engaging shift element, such that changes in the operating state, or shifts, can be performed reliably and preferably even without tractive force interruptions, with low shift forces, with a desired shift comfort and at the same time with acceptable shift times or within predefined shift times.

In the method according to the invention, the form-locking shift element is transferred into a disengaged operating state thereof in an at least nearly load-free operating state, whereby a high shift comfort can be attained with simultaneous low mechanical loads in the region of the form-locking shift element.

In a further advantageous variant of the method according to the invention, the transfer capability of the frictionally engaging shift element is reduced, preferably to zero, at least at approximately the time when the form-locking shift element disengages, so that the requested operating state of the transmission device can be provided without delays.

In a further advantageous variant of the method according to the invention, the transfer capability of the frictionally engaging shift element is varied depending on an operating temperature of the transmission device, in order to be able to perform a requested change of operating state in a manner adapted to the present operating state of the transmission device.

The form-locking shift element that is to be disengaged with a request for a tractive downshift for representing the requested target transmission ratio, in a further advantageous variant of the method according to the invention, is transferred before the disengagement into an at least nearly load-free operating state, by increasing the transfer capability of at least one frictionally engaging shift element that is not engaged in the power flow of the transmission device either for representing the present operating state of the transmission device or for representing the requested operating state. Therefore, a requested tractive downshift can be reliably performed within a predefined shift time without interruption of tractive force, and a transmission device having reproducible operating behavior can be provided.

The transfer capability of a frictionally engaging shift element that is disengaged while the present transmission ratio is represented and to be engaged for representing the requested target transmission ratio, in a further variant of the method according to the invention, in the presence of a transmission input speed which corresponds at least nearly to a synchronization speed corresponding to the requested target transmission ratio, is increased, while the form-locking shift element to be disengaged is transferred into a disengaged operating state.

Features specified in the following example embodiments of the subject matter according to the invention are suitable, alone or in any arbitrary combination, to further develop the subject matter according to the invention. The respective combinations of features do not represent limitations with respect to the further development of the subject matter according to the invention, but rather merely comprise examples.

Further advantages and advantageous embodiments of the subject matter according to the invention arise from the example embodiments described in principle below with reference to the drawings, wherein for the sake of clarity, in the description of the different example embodiments, components that are the same or functionally equivalent are provided with the same reference characters.

BRIEF DESCRIPTION OF THE DRAWINGS

In the figures:

FIG. 2 shows a gear diagram of a transmission device of the vehicle drive train according to FIG. 1;

DETAILED DESCRIPTION OF THE PREFERRED EMBODIMENTS

Figure 1:
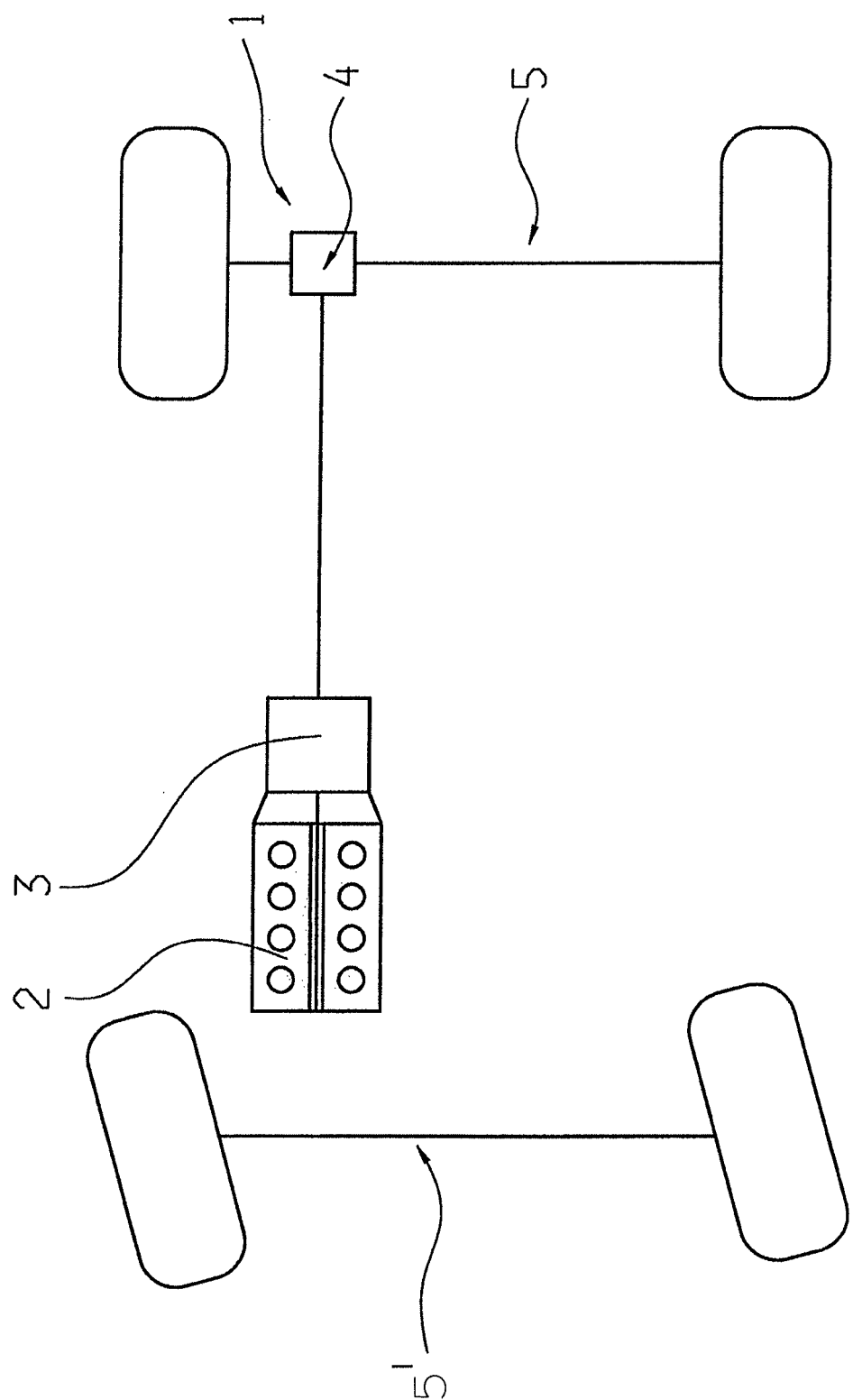
FIG. 1 shows a highly schematized representation of a vehicle drive train.

FIG. 1 shows a vehicle drive train 1 having a drive machine 2 designed here as an internal combustion engine, having a transmission device 3, by means of which different transmission ratios for forward and reverse travel can be represented, having a differential unit 4 and having two vehicle axles 5, 5', wherein here the vehicle axle 5 is the rear vehicle axle and the vehicle axle 5' is the front vehicle axle.

A gear diagram of the transmission device 3, or a multi-stage transmission, is shown in FIG. 2, which is known in principle from the generic document DE 10 2008 000 429.4 from the applicant. The transmission device 3 comprises a transmission input shaft 6 and a transmission output shaft 7, which is connected to the differential unit 4 when installed in a vehicle, while the transmission input shaft 6 is operatively connected to the drive machine 2.

Furthermore, the transmission device 3 comprises four planetary gear sets P1 to P4, wherein the first and the second planetary gear sets P1, P2 are preferably designed as minus planetary gear sets, forming a shiftable input side gear set, while the third and the fourth planetary gear sets P3, P4 represent the main gear set. In addition, the transmission device 3 comprises six shift elements A to F, of which the shift elements C, D and F are implemented as brakes, and the shift elements A, B and E are implemented as clutches.

A selective shifting of nine forward gears "1" to "9" and one reverse gear "R" can be realized with the shift elements A to F, wherein except for the fourth transmission ratio step "4", for implementing a transmission ratio in the transmission device 3, or for producing a power flow in the transmission device 3, in each case three shift elements are to be held simultaneously. In order to operate the transmission device 3 with a high spontaneity, the shift element A is also held in an engaged operating state while the fourth transmission ratio step "4" is represented, although this is not required for implementing the fourth transmission ratio step "4".

The shift elements A and F are designed here as form-locking shift elements, in order to reduce drag torques, caused by disengaged frictionally engaging shift elements, in the operation of the transmission device 3 in comparison to transmission devices that are designed having only frictionally engaging shift elements. Because form-locking shift elements in general can only be transferred from a disengaged operating state into an engaged operating state within a very narrow differential speed range around the synchronization speed, the synchronizing of a form-locking shift element to be engaged can be supported, or fully implemented, without additional designs by suitably actuating the frictionally engaging shift elements and the drive machine.

In the following, the manner of operation of a variant of the method according to the invention is described in more detail based on various operating state progressions over time t, shown in more detail in FIG. 4, of several operating parameters of the transmission device 3 according to FIG. 2.

At a time T1, the first transmission ratio step "1" is engaged in the transmission device 3, wherein the two form-locking shift elements A and F and additionally the frictionally engaging shift element D are present in a completely engaged operating state. At time T1, there is a request for a change of operating state, or for a shift, starting from the first transmission ratio step "1" into a neutral operating state "N" of the transmission device 3, which is why a progression GA undergoes a status change.

In the neutral operating state "N", essentially no drive torque can be transmitted from the transmission input shaft 6 to the transmission output shaft 7 by means of the transmission device 3 or vice versa. For this purpose, the frictionally engaging shift element D and the form-locking shift element A are to be disengaged, while the form-locking shift element F is further held in the engaged operating state to reduce the shift times of the transmission device 3. Because the form-locking shift element F is present in the engaged operating state for representing both the transmission ratio "R" for reverse travel, and for representing the first transmission ratio "1" for forward travel, and then in each case, only the shift elements A and D or the shift elements B and D are to be engaged, the transmission device 3 can be operated with high spontaneity.

To implement the shift request from the first transmission ratio step "1" for forward travel into the neutral operating state "N", initially the frictionally engaging shift element D is disengaged. At the same time, the form-locking shift element A is to be transferred into the disengaged operating state thereof, wherein with the completely disengaged shifting elements A and D, the shifting operation starting from the first transmission ratio step "1" into the neutral operating state "N" is completed.

Particularly in the case of very cold ambient temperatures of the transmission device 3, and resulting therefrom, low operating temperatures of the transmission device 3, drag torques in the transmission device 3 occurring in the region of the disengaged frictionally engaging shift elements B, C and E lead to the fact that the form-locking shift element A to be disengaged cannot be transferred into the disengaged state thereof within a desired shift time without generating reaction torques in the vehicle drive train 1 due to a so-called ripping of the shift element A, thereby degrading the driving comfort.

This results from the fact that the drag torques occurring in the transmission device 3 in the area of the form-locking shift element A to be disengaged are supported, and the form-locking shift element A is not present in an at least nearly load-free operating state to the desired extent that is necessary for shifting to be performed with high shift comfort. In particularly unfavorable operating states of the transmission device 3, the form-locking shift element A therefore can be disengaged only with high shift forces, or cannot be disengaged at all.

For this reason, at time T1, the transfer capability of the frictionally engaging shift element E is increased by a ramp-shaped increase of an actuating pressure p_E of the shift element E, starting from a completely disengaged operating state. By increasing the transfer capability of the shift element E and simultaneously lowering an actuating pressure p_D of the frictionally engaging shift element D to be disengaged, the drag torques m_A present at the form-locking shift element A to be disengaged are increasingly supported in the area of the frictionally engaging shift element E, and the form-locking shift element A to be disengaged is further unloaded.

Between a time T2 and a time T3, the actuating pressure p_D of the frictionally engaging shift element D to be disengaged is held constant, and at the time T3 is decreased to a disengaged pressure level at which the transfer capability of the frictionally engaging shift element D to be disengaged is essentially equal to zero.

With the completely disengaged frictionally engaging shift element D, and at the same time, further increasing transfer capability of the frictionally engaging shift element E, the drag torques present at the form-locking shift element A to be disengaged are increasingly supported in the area of the frictionally engaging shift element E, until the form-locking shift element A is present in an essentially load-free operating state at a time T4.

Due to the disengaging force, preferably available due to a spring device and acting on the form-locking shift element A to be disengaged in the direction of disengagement thereof, the form-locking shift element A at time T4 is disengaged substantially abruptly, wherein no reaction torques are generated in the vehicle drive train 1 that would degrade driving comfort or shift comfort.

At the time of disengagement T4 of the form-locking shift element A to be disengaged, the actuating pressure p_E of the frictionally engaging shift element E to be engaged is in turn decreased to the pressure level present at the time T1, whereby the requested change of the operating state is completed in the transmission device 3.

Figure 4:
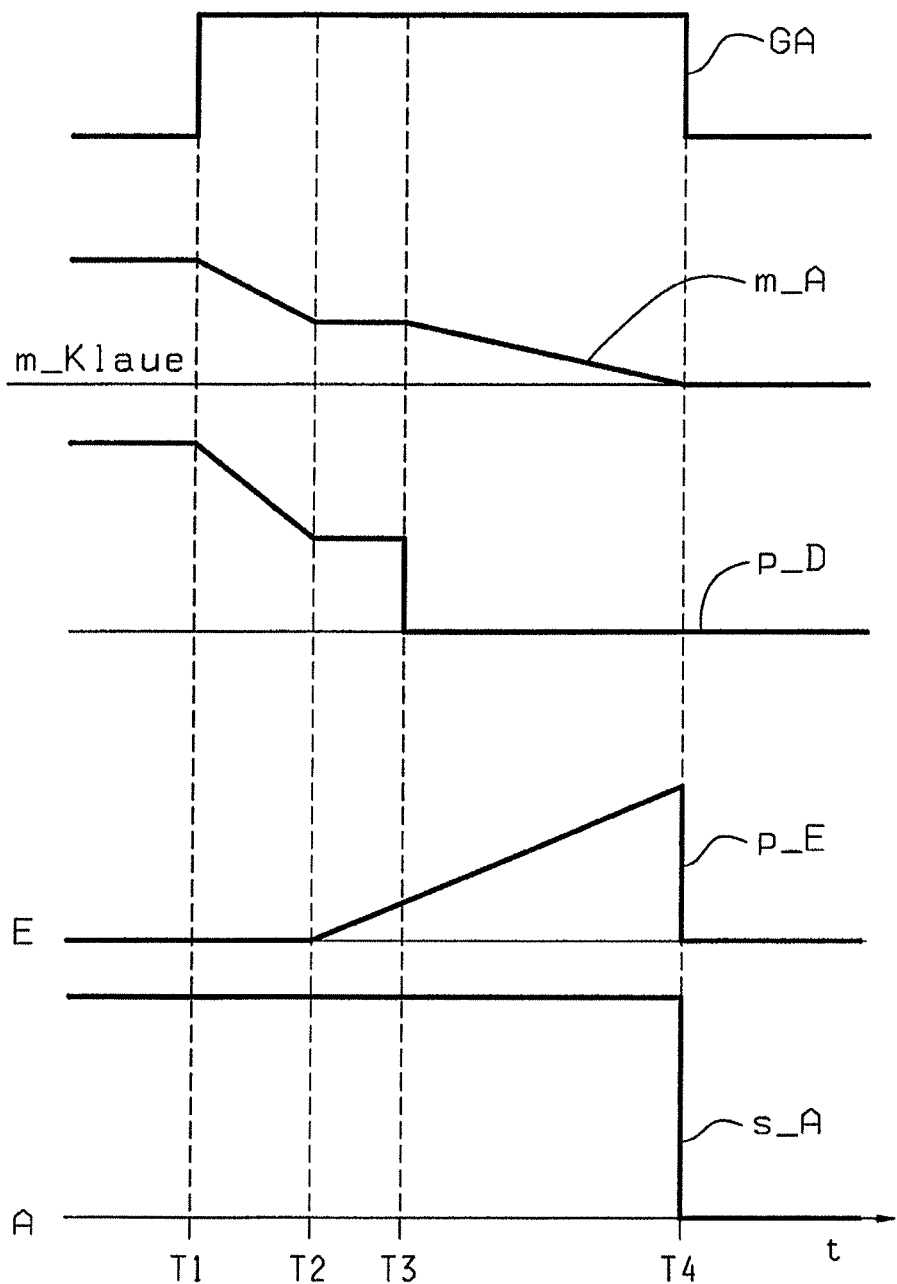
FIG. 4 shows several progressions of different operating state parameters of the transmission device according to FIG. 2 while a requested change of operating state of the transmission device is performed.

The switching of the form-locking shift element A from the engaged operating state thereof into the disengaged operating state thereof at time T4 is represented graphically by a sudden change in the progression s_A in FIG. 4. Wherein the progression s_A is the adjustment of the shift element halves of the form-locking shift element A, which can be brought into engagement with each other.

Due to the at least partial engagement of the frictionally engaging shift element E, in the transmission device 3, with the shift element A still engaged and the form-locking shift element F also engaged, the fourth transmission ratio step "4" is briefly at least nearly engaged. The temporary engagement of the frictionally engaging shift element E and, connected with that, the at least partial engagement of the fourth transmission ratio step "4" in the transmission device 3 leads to the fact that the part of the drag torques supported at the still engaged form-locking shift element A is reduced substantially to zero, and the form-locking connection in the area of the form-locking shift element A can be disengaged in an at least nearly load-free state of the shift element A. Thus, the requested gear disengagement of the transmission device 3 can be implemented within a predefined shift time while simultaneously attaining high shift comfort.

In the following, a further variant of the method according to the invention is described, based upon further progressions of operating state parameters represented in FIG. 5; where the method is performed during a tractive downshift in a transmission device 3 having a modified design with respect to the transmission device 3 according to FIG. 1, wherein with the second design of the transmission device 3, not represented more closely in the drawing, the shift element C is implemented as a form-locking shift element that for representing the target transmission ratio requested by the tractive upshift is to be transferred into an engaged operating state.

Figure 3:
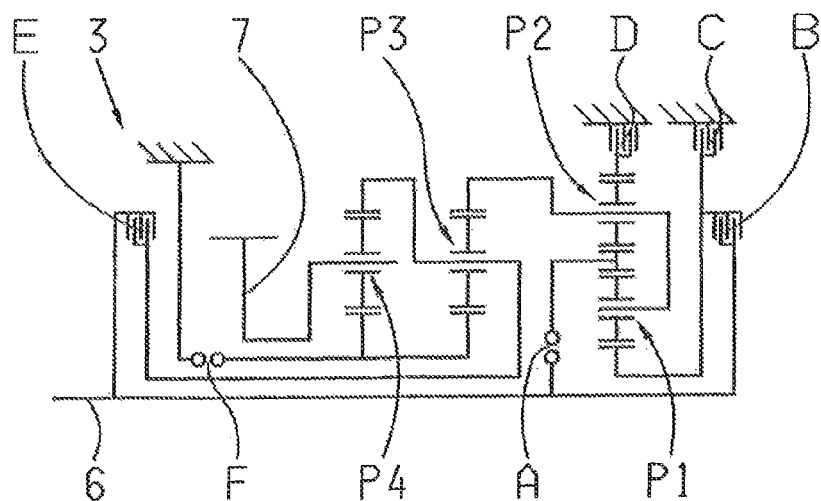
FIG. 3 shows a table form of a shift pattern of the transmission device according to FIG. 2.

The following description is therefore based on a transmission device 3 which, except for the shift element C, basically has the same design as the transmission device 3 according to FIG. 2, in which the shift element C is implemented as a frictionally engaging shift element. In the second embodiment of the transmission device 3, the different transmission ratio steps "1" to "9" for forwards travel and the transmission ratio "R" for reverse travel are engaged with the shift element C implemented preferably as a dog clutch, according to the shifting patterns in the transmission device 3 represented in FIG. 3.

Figure 5:
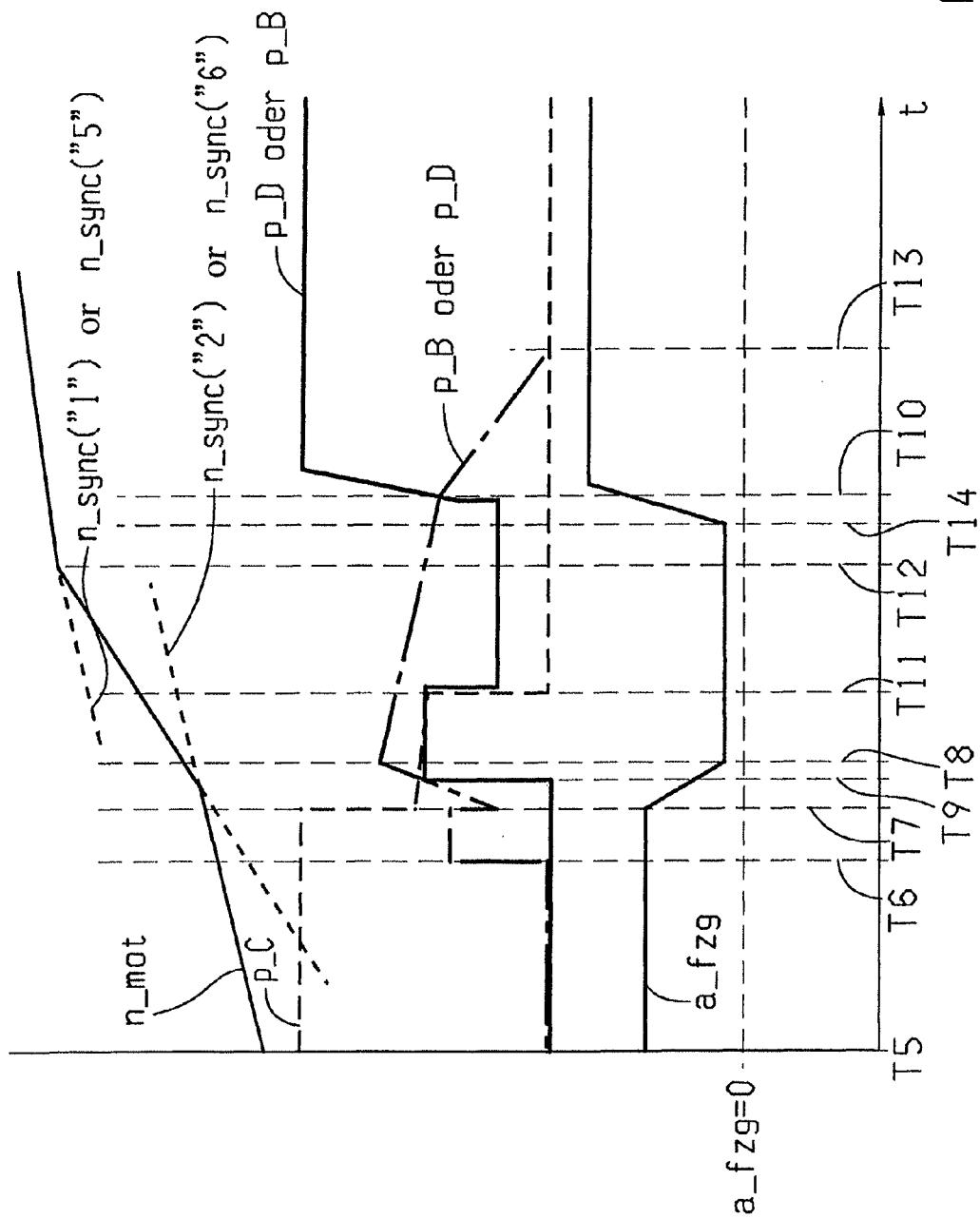
FIG. 5 shows different progressions of operating state parameters during an operating state progression, comprising a further shifting, of a second embodiment of the transmission device changed with respect to the transmission device according to FIG. 2.

The progressions of the different operating parameters shown in FIG. 5 occur during a tractive downshift in the transmission device 3, if the form-locking shift element C is disengaged for implemening the requested target transmission ratio in the transmission device 3.

Basically, the shift element C is to be engaged in the power flow of the transmission device 3 for implementing the second transmission ratio "2", the sixth transmission ratio "6", and the eighth transmission ratio "8", and to be transferred into or held in a disengaged operating state for implementing the further transmission ratios "1", "3" to "5", "7", and "9" for forward travel.

Furthermore, the progressions represented in FIG. 5 are purely qualitative progressions that characterize a tractive downshift starting from the present transmission ratio "2" into the target transmission ratio "1", or from the present transmission ratio "6" into the target transmission ratio "5".

At a time T5, the second transmission ratio "2" or the sixth transmission ratio "6" is engaged in the transmission device 3. At a subsequent further time T6, there is a request for a tractive downshift in the direction of the target transmission ratio "1" or "5", wherein for implementing the first transmission ratio "1", the form-locking shift element C is to be disengaged and the frictionally engaging shift element D is to be engaged, while the two form-locking shift elements A and F are maintained in the engaged operating state. If the tractive downshift request is for the fifth transmission ratio step "5" as a target transmission ratio, the form-locking shift element C is to be disengaged and the frictionally engaging shift element B is to be engaged in the power flow, while the form-locking shift element A and the frictionally engaging shift element E are held in the engaged operating state.

In the following the further variant of the method according to the invention is described in more detail initially during the performance of a tractive downshift starting from second transmission ratio step "2" in the direction of the requested first transmission ratio "1".

At the time T6, at which the there is the request for the tractive downshift, the frictionally engaging shift element B, which during the representation of the second transmission ratio step "2" is present substantially in the disengaged operating state thereof, is transferred into an operating state, during a rapid filling pulse extending up to a time T7, from which an increase of the actuating pressure p_B causes an increase of the transfer capability of the frictionally engaging shift element B. The form-locking shift element C to be disengaged is transferred at least nearly into a load-free operating state by appropriate increase of the transfer capability of the frictionally engaging shift element B.

For this purpose, from the time T7 up to a further time T8, the actuating pressure p_B of the frictionally engaging shift element B is increased, via a continuous pressure ramp, to a pressure value, and during a second pressure ramp subsequent to the first pressure ramp, is steadily decreased to a lower pressure level up to a time T10. At the same time, the actuating pressure p_C of the form-locking shift element C to be disengaged is decreased abruptly at a time T9, and subsequently left at this level up to a time T11, and in turn subsequently at time T10 is guided substantially completely to zero.

The latter description of the actuation of the frictionally engaging shift element B leads to the fact that a transmission input speed n_mot of the transmission device 3, approximately from time T8, starting from a speed equivalent to the synchronization speed n_synch ("2") of the present transmission ratio "2", is guided to a speed equivalent to a synchronization speed n_synch ("1") of the target transmission ratio "1", wherein the transmission input speed n_mot substantially corresponds to the synchronization speed n_synch ("1") present at a time T12 that is close to the time T10.

From the time T9, the frictionally engaging shift element D to be engaged is prepared substantially for the engagement at time T10 by an appropriate guidance of the actuating pressure p_D. At time T10, at which the transmission input speed n_mot corresponds substantially to a synchronization speed n_synch ("1") of the target transmission ratio "1", the actuating pressure p_D of the frictionally engaging shift element D is increased to the engaging pressure level and the form-locking shift element D is engaged.

The form-locking shift element C, due to the previously described actuation of the frictionally engaging shift element B, is substantially in a load-free operating state at time T11 and can be transferred in a simple manner from an engaged operating state into a disengaged operating state thereof. The actuating pressure p_B of the frictionally engaging shift element B is decreased essentially to zero after the time T10 via a pressure ramp lasting up to a time T13, whereby the requested tractive downshift starting from the second transmission ratio step "2" in the direction of the first transmission ratio step "1" can be considered completed.

While the requested tractive downshift is performed, the progression of the vehicle acceleration a_fzg is shown in FIG. 5 occurs, which is initially substantially constant between the times T5 and T7. At time T7, the vehicle acceleration a_fzg decreases up to time T9, and then remains at this level subsequently up to time T14.

From the time T14, the vehicle acceleration a_fzg increases to the level of the target transmission ratio "1", and remains substantially constant.

For a requested tractive downshift starting from the sixth transmission ratio "6" in the direction of the transmission ratio "5", the further variant of the method according to the invention described with FIG. 5 provides that the frictionally engaging shift element D, which is used for the load-free shifting of the form-locking shift element C during a tractive downshift starting from the sixth transmission ratio step "6" in the direction of the fifth transmission ratio step "5", is actuated to the same extent as the frictionally engaging shift element B provided for the load-free shifting of the form-locking shift element C during a tractive downshift starting from the second transmission ratio step "2" into the first transmission ratio step "1".

Based on the further variant of the method according to the invention described with FIG. 5, tractive downshifts can be performed with the transmission device 3 implemented with the form-locking shift element C without interruptions of the tractive force, and at the same time power losses due to drag torques are further reduced.

According to a variant of the method according to the invention, tractive downshifts, during which at least one form-locking shift element is to be disengaged, are started as a double upshift, or as a multiple upshift. As soon as the transmission input speed is guided in the direction of the speed equivalent to the synchronization speed n_sync ("1"), or n_synch ("5"), the form-locking shift element C to be disengaged is transferred substantially into a load-free operating state, and can then be easily transferred into the disengaged operating state thereof at a defined point in time. The transfer capability in each case of the frictionally engaging shift element B or D guaranteeing the load-free shifting of the form-locking shift element C, or the load-free shifting without interruption of tractive force of the form-locking shift element C, is lowered after the disengagement of the form-locking shift element C substantially back to zero or to a low value.

Because under certain circumstances there can be high frictional losses in the area of the shift elements B and D provided for the load-free shifting of the form-locking shift element C, these can be supplied for example by means of a strategic cooling and/or a corresponding transmission lubrication and/or can be implemented with high-performance friction linings.

In the variant of the procedure according to the invention, form-locking shift elements can each be used only for representing up to the (n−1)th gear of a transmission device with n gear steps, because in each case a frictionally engaging shift element to be engaged for representing the next higher gear is always used for the load-free shifting of the form-locking shift element to be disengaged, in order to be able to perform a tractive downshift without interruption of the tractive force.

The procedure according to the invention under certain circumstances leads to a reduction of fuel consumption of a vehicle even without the highest possible gear, or overdrive, if the reduction of the fuel consumption, due solely to the reduction of the drag torques in the area of the shifting elements, is greater than during operation in the additional overdrive.

REFERENCE CHARACTERS 1 vehicle drive train
2 internal combustion engine
3 transmission device
4 differential unit
5, 5' vehicle axles
6 transmission input shaft
7 transmission output shaft
"1" to "9" transmission ratio for forward travel
"N" neutral operating state of the transmission device
"R" transmission ratio for reverse travel
A_fzg vehicle acceleration
A to F shift elements
GA progression
m_A torque present at shift element A
n_mot transmission input speed
n_sync synchronization speed
p_B actuating pressure of the frictionally engaging shift element B
p_C actuating pressure of the frictionally engaging shift element C
p_D actuating pressure of the frictionally engaging shift element D
p_E actuating pressure of the frictionally engaging shift element E
s_A shift path of the form-locking shift element A
t time
T1 to T14 discrete points in time

The invention claimed is:

1. A method of operating a transmission device (3) having four planetary gear sets (P1, P2, P3, P4) and six shift elements (A, B, C, D, E, F) for selectively shifting nine forward gears ("1" to "9") and one reverse gear ("R"), the six shift elements comprising first, second, third and fourth frictionally engaging shift elements (B, C, D, E) and first and second form-locking shift elements (A, F), and, for each of the nine forward gears and one reverse gear, three of the six shift elements are simultaneously maintained in an engaged state for establishing a power flow of the transmission device (3), the method comprising the steps of:
transferring one of the first and the second form-locking shift elements (A, F), with a requested change of a present operating state of the transmission device (3), during which the one of the first and the second form-locking shift element (A, F) is transferred from an engaged operating state into an at least nearly load-free state by:
increasing a transfer capability of at least one of the frictionally engaging shift elements (B, C, D, E), which is only temporarily engaged in the power flow of the transmission device (3), when shifting from the present operating state to a requested operating state, and is not to be engaged in the power flow of the transmission device (3) either for the present operating state or the requested operating state; and
then transferring the one of the first and the second two form-locking shift elements, from the at least nearly load-free state, into a disengaged state.

2. The method according to claim 1, further comprising the step of:
decreasing the transfer capability of the at least one of the frictionally engaging shift element (B, C, D, E) to zero, at least approximately at a time of disengagement (T4) of the one of the first and the second form-locking shift element (A, F) into the disengaged state.

3. The method according to claim 1, further comprising the step of:
varying the transfer capability of the at least one of the frictionally engaging shift element (B, C, D, E) depending on an operating temperature of the transmission device (3).

4. The method according to claim 1, further comprising the step of:
disengaging the one of the first and the second form-locking shift element (A, F) into the disengaged state in a presence of a request for a tractive downshift to a requested target transmission ratio ("1" or "5"), and before the disengagement, the one of the first and the second form-locking shift element (A, F) is transferred into the at least nearly load-free operating state.

5. The method according to claim 4, further comprising the step of:
after transferring the one of the first and the second form-locking shift element (A, F) into the disengaged state,
increasing the transfer capability of a frictionally engaging shift element (D or B) that is disengaged during a present transmission ratio ("2" or "6") and is to be engaged for a requested target transmission ratio ("1" or "5"); and
increasing the transfer capability of the frictionally engaging shift element (D or B) in a presence of a transmission input speed (n_mot), which corresponds at least nearly to a synchronization speed (n_sync ("1") or n_sync ("5")) corresponding to the requested target transmission ratio ("1" or "5").

6. A method of operating a transmission device (3) having four planetary gear sets (P1, P2, P3, P4) and six shift elements (A, B, C, D, E, F) for selectively shifting nine forward gears ("1" to "9") and one reverse gear ("R"), the six shift elements comprising first, second, third and fourth frictionally engaging shift elements (B, C, D, E) and first and second form-locking shift elements (A, F), and, for each of the nine forward gears and one reverse gear, three of the six shift elements are simultaneously maintained in an engaged state for establishing a power flow of the transmission device (3) while a remaining three shift elements are simultaneously maintained in an disengaged state, the method comprising the steps of:
shifting one of the first and the second form-locking shift elements (A, F), with a requested change of a present operating state of the transmission device (3) to a requested operating state, during which the one of the first and the second form-locking shift elements (A, F) is shifted from the engaged state, temporarily into an at least nearly load-free state; and
increasing a transfer capability of at least one of the frictionally engaging shift elements (B, C, D, E) by shifting at least one of the frictionally engaging shift elements (B, C, D, E) to facilitate disengagement of the one of the first and the second form-locking shift elements (A, F), during which the at least one of the frictionally engaging shift elements (B, C, D, E) is shifted from a disengaged state into a temporarily engaged state such that the at least one of the frictionally engaging shift elements (B, C, D, E) is only temporarily engaged in the power flow of the transmission device, when the transmission device (3) is shifting from the present operating state to the requested operating state, and the at least one of the frictionally engaging shift elements (B, C, D, E) is not engaged in the power flow of the transmission device (3) for either the present operating state or the requested operating state; and then shifting the one of the first and the second two form-locking shift elements from the at least nearly load-free state into a disengaged state.

7. A method of operating a transmission device (3) having four planetary gear sets (P1, P2, P3, P4) and six shift elements (A, B, C, D, E, F) for selectively shifting nine forward gears ("1" to "9") and one reverse gear ("R"), the six shift elements comprising first, second, third and fourth frictionally engaging shift elements (B, C, D, E) and first and second form-locking shift elements (A, F), for each of the nine forward gears and one reverse gear, three of the six shift elements are simultaneously maintained in an engaged state for establishing a power flow of the transmission device (3) while a remaining three shift elements are simultaneously maintained in an disengaged state; the method comprising the steps of:

requesting a change from the present operating state of the transmission device (3) into a requested operating state of the transmission device (3);

shifting one of the first and the second form-locking shift elements (A, F), from the engaged state into a temporary at least nearly load-free state; and shifting at least one of the frictionally engaging shift elements (B, C, D, E) to facilitate disengagement of one of the first and the second form-locking shift elements (A, F), during which the at least one of the frictionally engaging shift elements (B, C, D, E) is shifted from a disengaged state into a temporarily engaged state such that the at least one of the frictionally engaging shift elements (B, C, D, E) is only temporarily engaged in the power flow of the transmission device, when the transmission device is shifting from the present operating state to the requested operating state, and the at least one of the frictionally engaging shift elements (B, C, D, E) is not engaged in the power flow of the transmission device (3) for either the present operating state or the requested operating state; and then shifting the one of the first and the second two form-locking shift elements from the at least nearly load-free state into the disengaged operating state.

* * * * *